No. 653,796. Patented July 17, 1900.
S. F. ETTINGER.
TYPE WRITER RIBBON CLAMP.
(Application filed Jan. 29, 1900.)
(No Model.)
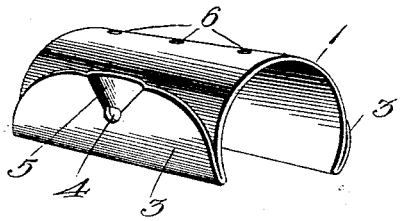
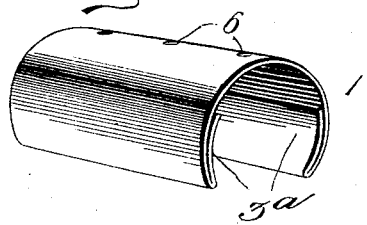
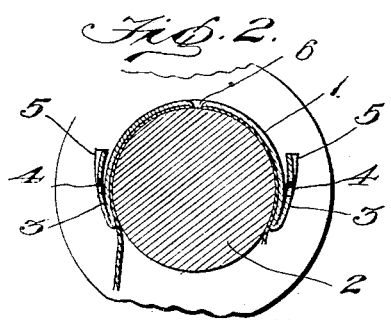
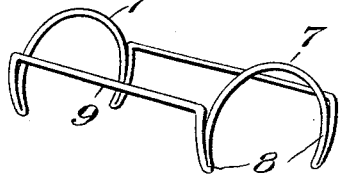
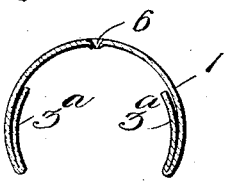
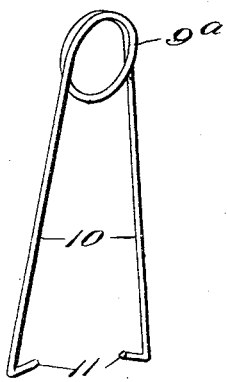
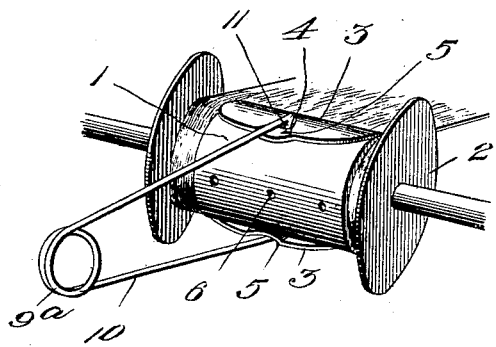
Samuel F. Ettinger, Inventor
Witnesses

UNITED STATES PATENT OFFICE.

SAMUEL F. ETTINGER, OF LITTLE ROCK, ARKANSAS, ASSIGNOR OF THIRTY-THREE FIFTIETHS TO H. S. DUKES AND J. A. WILLIAMS, OF SAME PLACE.

TYPE-WRITER-RIBBON CLAMP.

SPECIFICATION forming part of Letters Patent No. 653,796, dated July 17, 1900.

Application filed January 29, 1900. Serial No. 3,212. (No model.)

*To all whom it may concern:*

Be it known that I, SAMUEL F. ETTINGER, a citizen of the United States, residing at Little Rock, in the county of Pulaski and State of Arkansas, have invented a new and useful Type-Writer-Ribbon Clamp, of which the following is a specification.

The invention relates to devices for attaching the ends of the ribbon to the ribbon spool or reel of a type-writer; and the object is to provide means by which the ribbon can be easily and quickly attached to or detached from the spool without the use of pins, tape, or like means for fastening.

The device preferably consists in the construction fully described in the following specification, and shown in the accompanying drawings, which form a part thereof, and in which—

Figure 1 is a perspective view of the preferred form of my device. Fig. 2 is a cross-section of the same, showing it applied to the spool-core. Fig. 3 is a perspective view showing the manner of detaching the clamp from the spool. Fig. 4 is a perspective view of a modified form. Fig. 5 is a cross-section of the same. Fig. 6 is another modification. Fig. 7 is a device for removing the clamp from a spool.

Similar reference-numerals designate similar parts throughout the several figures.

The numeral 1 designates a semicylindrical body, which in the preferred form of the invention is constructed from a flat piece of sheet metal, and said body is adapted to tightly embrace the core of a type-writer spool or reel 2 and extend more than halfway around the same. This form, as shown in Figs. 1, 2, and 3, has rounded ends, which are bent backwardly to form lips 3. The lips 3 do not lie upon the semicylindrical body portion, but possess sufficient spring to normally hold them a slight distance from the same, as clearly shown in Fig. 2. The outer ends of the lips are provided with the perforations 4, which are adapted to be engaged by the detaching device hereinafter described, and flaring depressions or grooves 5 extend from these perforations to the edge of the lips, said depressions forming guides, as hereinafter explained. The cylindrical portion may be further provided with a series of indentations 6, which form an inner roughened surface and more securely hold the ribbon in place.

The modification shown in Fig. 6 is of substantially the same character as that of Figs. 1, 2, and 3, except that the semicylindrical body 1 is made of wire, the two ends 7 being bent into circular form and the lips being formed by the backwardly-turned portions 8 and the connecting cross-pieces 9.

In Figs. 4 and 5 another modification is shown which still embodies the same principle. In this form the body 1 is provided with backwardly-bent lips $3^a$, which are in this case bent inwardly and which do not touch the inner wall of the body 1, but as in the other forms preferably possess enough spring to hold them out from the inner walls. This form is particularly adapted for use on spools having metallic cores, as the ends of the inturned lips form gripping edges which more securely hold the device in place.

The principal function of the backwardly-turned lips is to give added strength and rigidity to the ends or gripping portions of the device, as they curve back far enough to act as a reinforcement to the clamp at the point where the strain will come if the ribbon is pulled—that is, at the ends of the clamp. There is practically no strain on the center of the curved clamp if a pull is exerted on the ribbon; but at the ends where the pull will be felt an added stiffness is given by means of the additional layer of metal, which prevents the ends from pulling away from the spool. The result is that a device is provided that is stiff at the ends and elastic in the center, and it is the central portion that bends when the clamp is placed in position or removed.

For removing the clamp from a spool I use a detaching device comprising a double-arm spring, the preferred form of which is illustrated in Fig. 7. This form is composed of a single wire coiled at its center portion, as at $9^a$, and having the two arms 10, the ends 11 of which are bent inwardly toward each other and at an acute angle to the arms to form engaging prongs. In applying the device the end of the ribbon is laid over the spool, the edges of the cylindrical portion are placed against the same, and by giving a slight push against the device the edges will open enough to slide over the spool, and the clamp extending more than half-way around the same will secure the ribbon in place. To remove the clamp, the inwardly-bent engaging prongs of the detaching device are engaged in the openings 4. This is easily accomplished by placing the ends in the depressions 5, which will guide them directly to place. Upon drawing backwardly upon the arms the tendency will be to open the edges of the clamp, and it may be easily drawn from the spool without soiling the fingers.

In removing clamps constructed as shown in Figs. 4 and 6 the prongs 11 are engaged with the edges, whereupon the clamp can be easily removed.

It will be noted that a portion of the spool-core is not covered, thereby permitting the device to be used upon spools carrying automatic ribbon-shifting mechanism wherein the spool is slotted to receive a weighted lever.

It will thus be seen that I have constructed a ribbon-attaching device entirely separate and distinct from the ribbon itself that will securely hold a ribbon in place and by means of which a ribbon can be quickly and easily attached to or removed from a spool without soiling the hands. Furthermore, the clamp provides an unobstructed exterior, which permits the winding of the ribbon around the same.

It will be understood that other changes in the form, proportion, and minor details of construction may be resorted to without departing from the spirit or sacrificing any of the advantages of the invention.

Having now fully described my invention, what I claim as new, and desire to secure by Letters Patent, is—

1. A type-writer-ribbon clamp, comprising a semicylindrical body portion having backwardly-folded reinforcing-lips at its end edges, said lips extending partly around and conforming substantially to the contour of the body portion, whereby a reinforcement for the gripping portions of the clamp is provided, and said clamp has an unobstructed exterior to permit the winding of the ribbon thereon, substantially as described.

2. A type-writer-ribbon clamp comprising a semitubular body portion, the ends of which are bent backwardly forming lips, said lips being provided with engaging openings, for a detaching device substantially as described.

3. A type-writer-ribbon clamp comprising a semitubular body portion and backwardly-turned lips, said lips being each provided with an engaging opening and having a guiding-depression extending from the edge of the lip to the opening for a detaching device, substantially as described.

4. As an article of manufacture, a type-writer-ribbon holder comprising a circular spring-clamp having openings therein and guiding-recesses leading to said openings for coöperation with a detaching device, substantially as described.

In testimony that I claim the foregoing as my own I have hereto affixed my signature in the presence of two witnesses.

SAMUEL F. ETTINGER.

Witnesses:
 FRED CLAYTON,
 CLEMENT H. YOST.